United States Patent
Yan et al.

(10) Patent No.: US 9,699,769 B2
(45) Date of Patent: Jul. 4, 2017

(54) METHOD, APPARATUS AND SYSTEM FOR EXCHANGING COMMON E-RGCH INFORMATION

(71) Applicant: Huawei Technologies Co., Ltd., Shenzhen, Guangdong (CN)

(72) Inventors: Kun Yan, Shenzhen (CN); Yanyan Chen, Shenzhen (CN); Liwei Qiu, Shanghai (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 14/701,051

(22) Filed: Apr. 30, 2015

(65) Prior Publication Data
US 2015/0237612 A1 Aug. 20, 2015

Related U.S. Application Data

(63) Continuation of application No. PCT/CN2012/083762, filed on Oct. 30, 2012.

(51) Int. Cl.
*H04W 4/00* (2009.01)
*H04W 72/04* (2009.01)

(52) U.S. Cl.
CPC .............................. *H04W 72/0406* (2013.01)

(58) Field of Classification Search
None
See application file for complete search history.

(56) References Cited

U.S. PATENT DOCUMENTS

2007/0025300 A1* 2/2007 Terry .................. H04W 52/346 370/335
2007/0042785 A1* 2/2007 Nakamata ............. H04W 76/04 455/450

(Continued)

FOREIGN PATENT DOCUMENTS

CN 1798418 A 7/2006
CN 101132615 A 2/2008

(Continued)

OTHER PUBLICATIONS

Change Request, "Clarifications on autonomous search function for CSG", ST-Ericsson, 3GPP-TSG-RAN WG2 Meeting #67bis, Oct. 12-16, 2009, 2 pages, R2-095772.

(Continued)

*Primary Examiner* — Anh-Vu Ly

(57) ABSTRACT

The present application discloses a method, an apparatus and a system for exchanging common E-RGCH information. The method includes: receiving a common E-RGCH information message of a cell managed by a second RNC, where the common E-RGCH information message is sent by the second RNC; selecting a candidate common E-RGCH receiving neighboring cell set for the UE, where the candidate common E-RGCH receiving neighboring cell set includes a neighboring cell with an available common E-RGCH feature and the neighboring cell is determined according to common E-RGCH information message sent by the second RNC; and sending common E-RGCH configuration parameter information of each cell in the candidate common E-RGCH receiving neighboring cell set to the UE.

20 Claims, 5 Drawing Sheets

(56) References Cited

U.S. PATENT DOCUMENTS

| | | | |
|---|---|---|---|
| 2007/0049309 A1* | 3/2007 | Pan | H04W 72/1289 455/509 |
| 2007/0054652 A1* | 3/2007 | Pan | H04W 72/14 455/403 |
| 2007/0061673 A1* | 3/2007 | Pan | H04L 1/0045 714/758 |
| 2010/0222059 A1* | 9/2010 | Pani | H04W 72/0453 455/436 |
| 2012/0120899 A1* | 5/2012 | Kazmi | H04B 7/264 370/329 |
| 2012/0220324 A1 | 8/2012 | Sambhwani et al. | |
| 2012/0315910 A1* | 12/2012 | Geary | H04W 36/0005 455/437 |
| 2013/0329656 A1* | 12/2013 | Goransson | H04W 76/046 370/329 |
| 2014/0078959 A1* | 3/2014 | Goransson | H04B 7/0404 370/328 |

FOREIGN PATENT DOCUMENTS

| | | |
|---|---|---|
| CN | 102480756 A | 5/2012 |
| RU | 2409012 C2 | 1/2011 |
| WO | WO 2008/028360 A1 | 3/2008 |
| WO | WO 2012/071911 A1 | 6/2012 |
| WO | WO 2012/112605 A1 | 8/2012 |

OTHER PUBLICATIONS

"3rd Generation Partnership Project; Technical Specification Group Radio Access Network; UTRAN Iur interface Radio Network Subsystem Application Part (RNSAP) signalling (Release 11)", 3GPP Ts 25.423 V11.3.1, Sep. 2012, 1157 pages.

"3rd Generation Partnership Project; Technical Specification Group Radio Access Network; Radio Resource Control (RRC); Protocol specification (Release 11)", 3GPP TS 25.331 V11.3.0, Sep. 2012, 1981 pages.

"E-AGCH/E-RGCH/E-HICH Code Change Indicator", ZTE, 3GPP TSG RAN WG3#53, Aug. 28-Sep. 1, 2006, 3 pages.

Change Request, "E-AGCH/E-RGCH/E-HICH Code Change Indicator", ZTE, 3GPP TSG RAN WG3 Meetings #53, Aug. 28-Sep. 1, 2006, 22 pages.

Change Request, "Corrections to DC-HSUPA operation", Ericsson, ST-Ericsson, InterDigital, 3GPP TSG-RAN WG2 Meeting #67bis, Oct. 12-16, 2009, 21 pages.

"3rd Generation Partnership Project; Technical Specification Group Radio Access Network; Enhanced uplink; Overall description; Stage 2 (Release 11)", 3GPP TS 25.319 V11.5.0, Sep. 2012, 85 pages.

* cited by examiner

METHOD, APPARATUS AND SYSTEM FOR EXCHANGING COMMON E-RGCH INFORMATION

CROSS-REFERENCE TO RELATED APPLICATIONS

This application is a continuation of International Application No. PCT/CN2012/083762, filed on Oct. 30, 2012, which is hereby incorporated by reference in its entirety.

TECHNICAL FIELD

The present invention relates to the communications field and in particular, to a method, an apparatus and a system for exchanging common E-RGCH information.

BACKGROUND

To reduce uplink interference to data transmission of a user in a non-serving neighboring cell when a UE in a CELL-FACH (cell_forward access channel) state performs uplink data transmission in a neighboring cell, 3GPP Rel-11 introduced a concept of a common E-RGCH (common enhanced dedicated channel relative grant channel), so that a non-serving neighboring cell does not decode a specific UE when sending a non-serving Relative Grant value on a common E-RGCH. That is, during control of interference generated by UEs, a degree of interference generated by each UE is not differentiated but unified control is exercised on a group of UEs. Generally, the non-serving neighboring cell does not analyze which UE has caused interference but only references a situation about interference to the non-serving neighboring cell itself. When detecting that uplink interference to the non-serving neighboring cell itself is excessively severe, the non-serving neighboring cell sends a Down command on a common RG channel. After receiving the command, a UE may perform service grant updating. In this way, a UE with relatively serious interference lowers an SG value to reduce available power. That is, when a UE 1 establishes an RRC connection with a serving neighboring cell and performs data transmission in the serving neighboring cell, the UE needs to monitor a common E-RGCH channel of a neighboring cell that may be subject to uplink interference caused by data transmission of the UE 1. When the neighboring cell to which the UE belongs and the neighboring cell interfered by the UE belong to different radio network controllers (RNC), the UE may fail to obtain common E-RGCH information of a neighboring RNC, thereby causing a failure of a common E-RGCH feature to operate correctly.

Specifically, it is assumed that a serving cell to which the UE 1 in a CELL-FACH state belongs is a cell 1, the cell 1 is managed by an RNC 1 and an uplink-interfered cell 2 of the cell 1 is managed by an RNC 2. In this case, if the cell 2 is expected to perform interference control for the UE 1, the UE 1 in the CELL-FACH state needs to monitor a common E-RGCH channel of the cell 2, that is, the UE 1 in the CELL_FACH state needs to obtain common E-RGCH information of the cell 2 after establishing an RRC connection with the serving cell in the first RNC, so that the UE 1 can monitor a non-serving E-RGCH channel of the cell 2 so as to receive an RG down command sent by the cell 2.

In this case, however, probably an Iur interface does not exist for the UE 1 in the CELL_FACH state and only the first RNC of the serving cell to which the UE 1 belongs provides a service for the UE 1; and because there is no dedicated Iur connection between the second RNC and the UE 1 for the UE, the first RNC cannot obtain common E-RGCH resource information of the uplink-interfered cell that belongs to the second RNC in a process of establishing an Iur interface of the UE 1 and also cannot know whether the cell 2 supports the common E-RGCH feature, thereby causing a failure of the common E-RGCH feature to operate correctly.

In the prior art, the following manner may be used to obtain common E-RGCH information of a neighboring RNC: By using OAM configuration on the first RNC, configuration parameter information, such as a common E-RGCH channelization code and a signature sequence of an intra-frequency cell managed by a neighboring RNC of the first RNC, is manually configured in a manner of configuration through a network management and maintenance client.

After common E-RGCH state information or common E-RGCH configuration parameter information of a cell managed by the second RNC changes, if the cell of the second RNC whose common E-RGCH configuration has changed is a cell in a candidate common E-RGCH receiving neighboring cell set of a UE in a cell managed by the first RNC, the UE in the cell managed by the first RNC will monitor a wrong common E-RGCH channel, thereby causing a failure of the common E-RGCH feature to operate correctly.

SUMMARY

In view of this, the present application provides a method, an apparatus and a system for exchanging common E-RGCH information.

In an aspect of the present application, a method for exchanging common E-RGCH information is provided, including:

receiving a common E-RGCH information message of a cell managed by a second radio network controller (RNC), where the common E-RGCH information message is sent by the second RNC and includes at least one of common E-RGCH state information and common E-RGCH configuration parameter information;

receiving a radio resource control (RRC) connection establishment request sent by a user equipment (UE) and establishing an RRC connection with the UE in a serving cell;

determining a candidate common E-RGCH receiving neighboring cell set of the UE according to the common E-RGCH information message; and sending common E-RGCH configuration parameter information of each cell in the candidate common E-RGCH receiving neighboring cell set to the UE.

Further, before the receiving a common E-RGCH information message of a cell managed by a second radio network controller (RNC), where the common E-RGCH information message is sent by the second RNC, the method further includes: updating common E-RGCH information of the cell managed by the second RNC.

Further, the updating common E-RGCH information of the cell managed by the second RNC includes: changing the common E-RGCH information of the cell managed by the second RNC from available to unavailable, changing the common E-RGCH information from Unavailable to Available, or changing a configuration parameter of a common E-RGCH.

Further, the common E-RGCH information message includes: an information report message, an information exchange initiation response message, or an information exchange initiation failure message.

Further, the common E-RGCH configuration parameter information includes at least one or any combination of the following: an E-RGCH channelization code, an E-RGCH signature sequence and a minimum service grant value.

Further, the common E-RGCH state information includes at least one or any combination of the following: activation of a common E-RGCH feature, deactivation of the common E-RGCH feature, enabling of a configuration parameter of the common E-RGCH, disabling of a configuration parameter of the common E-RGCH, configuration of a configuration parameter of the common E-RGCH as Available and configuration of a configuration parameter of the common E-RGCH as Unavailable.

Further, before the receiving a common E-RGCH information message of a cell managed by a second radio network controller (RNC), where the common E-RGCH information message is sent by the second RNC, the method further includes: sending an information request message used to acquire the common E-RGCH information message to the second RNC.

Further, the information request message includes an information exchange initiation request message.

In another aspect, an apparatus for exchanging common enhanced dedicated channel relative grant channel (common E-RGCH) information is further provided, including:

an information message receiving unit, configured to receive a common E-RGCH information message of a cell managed by a second radio network controller (RNC), where the common E-RGCH information message is sent by the second RNC and includes at least one of common E-RGCH state information and common E-RGCH configuration parameter information;

an RRC connection managing unit, configured to receive a radio resource control (RRC) connection establishment request sent by a UE and establish an RRC connection with the UE in a serving cell;

a candidate common E-RGCH receiving neighboring cell set determining unit, configured to determine a candidate common E-RGCH receiving neighboring cell set of the UE according to the common E-RGCH information message; and a configuration parameter information delivering unit, configured to send the candidate common E-RGCH receiving neighboring cell set and common E-RGCH configuration parameter information of each cell in the candidate common E-RGCH receiving neighboring cell set to the UE.

Further, the common E-RGCH information message includes: an information report message, an information exchange initiation response message, or an information exchange initiation failure message.

Further, the common E-RGCH configuration parameter information includes at least one of: an E-RGCH channelization code, an E-RGCH signature sequence and a minimum service grant value.

Further, the apparatus further includes: an information request message sending unit, configured to send an information request message used to acquire the common E-RGCH information message to the second RNC.

Further, the information request message includes an information exchange initiation request message.

In another aspect, an apparatus for exchanging common enhanced dedicated channel relative grant channel (common E-RGCH) information is further provided, including:

an information message sending unit, configured to send a common E-RGCH information message of a cell managed by a second RNC, where the common E-RGCH information message includes at least one of common E-RGCH state information and common E-RGCH configuration parameter information.

Further, the apparatus further includes: a triggering unit, configured to trigger, when it is determined that common E-RGCH information of a cell managed by the second RNC is updated, the information message sending unit to send an updated common E-RGCH information message.

Further, the apparatus further includes: an update determining unit, configured to determine whether common E-RGCH information of a cell managed by the second RNC is updated, where the updating includes: changing a common E-RGCH feature of the cell managed by the second RNC from Available to Unavailable, changing the common E-RGCH feature from Unavailable to Available, or changing a configuration parameter of a common E-RGCH.

Further, the common E-RGCH information message includes: an information report message, an information exchange initiation response message, or an information exchange initiation failure message.

In another aspect, a system for exchanging common enhanced dedicated channel relative grant channel (common E-RGCH) information is further provided, including:

an information message receiving unit, configured to receive a common E-RGCH information message of a cell managed by a second radio network controller (RNC), where the common E-RGCH information message is sent by the second RNC and includes at least one of common E-RGCH state information and common E-RGCH configuration parameter information;

an RRC connection managing unit, configured to receive a radio resource control (RRC) connection establishment request sent by a UE and establish an RRC connection with the UE in a serving cell;

a candidate common E-RGCH receiving neighboring cell set determining unit, configured to determine a candidate common E-RGCH receiving neighboring cell set of the UE according to the common E-RGCH information message;

a configuration parameter information delivering unit, configured to send the candidate common E-RGCH receiving neighboring cell set and common E-RGCH configuration parameter information of each cell in the candidate common E-RGCH receiving neighboring cell set to the UE; and an information message sending unit, configured to send a common E-RGCH information message of a cell managed by the second RNC, where the common E-RGCH information message includes at least one of common E-RGCH state information and common E-RGCH configuration parameter information.

In another aspect, an apparatus for exchanging common enhanced dedicated channel relative grant channel (common E-RGCH) information is further provided, including:

a receiver, configured to receive a common E-RGCH information message of a cell managed by a second radio network controller (RNC), where the common E-RGCH information message is sent by the second RNC and includes at least one of common E-RGCH state information and common E-RGCH configuration parameter information; and a processor, configured to receive a radio resource control (RRC) connection establishment request sent by a UE and establish an RRC connection with the UE in a serving cell; determine a candidate common E-RGCH receiving neighboring cell set of the UE according to the common E-RGCH information message; and send the candidate common E-RGCH receiving neighboring cell set and common E-RGCH configuration parameter information of each cell in the candidate common E-RGCH receiving neighboring cell set to the UE.

Further, the common E-RGCH information message includes: an information report message, an information exchange initiation response message, or an information exchange initiation failure message.

Further, the common E-RGCH configuration parameter information includes at least one of: an E-RGCH channelization code, an E-RGCH signature sequence and a minimum service grant value.

Further, the processor is further configured to send an information request message used to acquire the common E-RGCH information message to the second RNC.

Further, the information request message includes an information exchange initiation request message.

In another aspect, an apparatus for exchanging common enhanced dedicated channel relative grant channel (common E-RGCH) information is further provided, including:

a transmitter, configured to send a common E-RGCH information message of a cell managed by a second RNC, where the common E-RGCH information message includes at least one of common E-RGCH state information and common E-RGCH configuration parameter information;

and a processor, configured to periodically trigger the transmitter to send the commonE-RGCH information message, or configured to trigger, when it is determined that common E-RGCH information of a cell managed by the second RNC is updated, the information message sending unit to send the common E-RGCH information message, or configured to send the common E-RGCH information message when an information request message sent by a first RNC for requesting the common E-RGCH information message is received.

Further, the processor is configured to determine whether the common E-RGCH information of a cell managed by the second RNC is updated, where the updating includes: changing a common E-RGCH feature of the cell managed by the second RNC from Available to Unavailable, changing the common E-RGCH feature from Unavailable to Available, or changing a configuration parameter of a common E-RGCH.

Further, the common E-RGCH information message includes: an information report message, an information exchange initiation response message, or an information exchange initiation failure message.

As can be seen from the foregoing technical solutions, in the present application, by exchanging common E-RGCH information between RNCs, a UE 1 can automatically acquire current common E-RGCH information of a serving cell with a common E-RGCH feature that is managed by another RNC in an uplink-interfered neighboring cell set, thereby avoiding the following problem: After the common E-RGCH information of the serving cell managed by the another RNC changes, configuration parameter information of a corresponding common E-RGCH in the UE 1 cannot be updated in time and as a result incorrect monitoring occurs.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
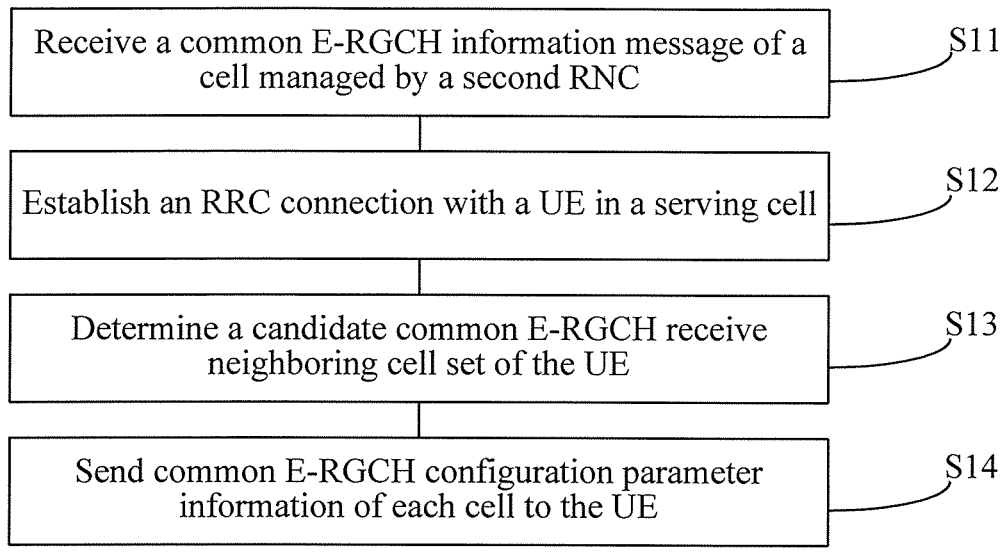
FIG. 1 is a schematic diagram of steps in a method for exchanging common E-RGCH information according to the present application.

As shown in FIG. 1, the present application provides a method for exchanging common E-RGCH information, including the following steps:

S11. Receive a common E-RGCH information message of a neighboring cell managed by a second radio network controller (RNC), where the common E-RGCH information message is sent by the second RNC and includes at least one of common E-RGCH state information and common E-RGCH configuration parameter information.

In the present application, a first RNC and a second RNC that is adjacent to the first RNC are used as an example. A cell managed by the first RNC is a cell on which a UE 1 camps and in which the UE 1 establishes an RRC connection; all neighboring cells of a serving cell that are subject to interference caused by uplink data transmission of the UE 1 may be called an uplink-interfered neighboring cell set; in the uplink-interfered neighboring cell set, a cell may not be managed by the first RNC, that is, the cell may be managed by another RNC; and in the present application, the another RNC may be called the second RNC, that is, a cell managed by the second RNC may belong to the uplink-interfered neighboring cell set of the UE 1.

For example, cells numbered 1 to 100 are managed respectively by the first RNC and the second RNC If the UE 1 performs data transmission in cells numbered 1 to 10 of the first RNC, uplink interference may be caused to cells numbered 81 to 100 of the second RNC. For example, when the UE 1 performs data transmission in a cell 1 of the first RNC, interference may be caused to cells numbered 81 to 85 of the second RNC; and for another example, when the UE 1 performs data transmission in a cell 2 of the first RNC, interference may be caused to cells numbered 86 to 90 of the second RNC.

Even if the first RNC does not know which UEs will establish RRC connections and perform uplink data transmission in which cells of the first RNC currently or later at all, the first RNC may still acquire, at any moment (even when no UE has established any RRC connection in the cells numbered 1 to 10), common E-RGCH information of a cell among the cells managed by the second RNC. The first RNC may acquire, through one or more processes, the common E-RGCH information of a cell managed by the second RNC from the second RNC.

In the present application, when a common E-RGCH feature of an uplink-interfered neighboring cell is available, a manner of sending an RG down command on a common E-RGCH to a UE in another cell that serves as an interference source may be used to reduce an uplink data transmission rate of the UE, so as to reduce uplink interference. In this manner, first the uplink-interfered neighboring cell needs to support a common E-RGCH function, that is, the common E-RGCH feature of the uplink-interfered neighboring cell is available. In addition, for a cell that supports the common E-RGCH feature, the common E-RGCH feature needs to be configured or activated and channel parameters of the common E-RGCH need to be available, that is, the common E-RGCH feature of the cell is available. Furthermore, the UE controlled by the command sent on the common E-RGCH channel needs to obtain current common E-RGCH configuration parameter information of the uplink-interfered neighboring cell beforehand, so that the UE can monitor the common E-RGCH of the uplink-interfered neighboring cell and then the UE adjusts its own uplink transmit power by monitoring and receiving the RG down command sent by the uplink-interfered neighboring cell, thereby reducing interference to the uplink-interfered neighboring cell.

Because a part of uplink-interfered neighboring cells of the UE 1 may be managed by the second RNC, the UE 1 may fail to acquire the common E-RGCH information of a cell managed by the second RNC in the uplink-interfered neighboring cell set. Therefore, in the present application, the second RNC sends a common E-RGCH information message of a cell managed by the second RNC to the first RNC, thereby implementing exchange of common E-RGCH information between the first RNC and the second RNC. Specifically, the common E-RGCH information message may include the common E-RGCH state information, or may further include the common E-RGCH configuration parameter information.

In this way, the first RNC has acquired common E-RGCH information of the serving cell managed by the second RNC in the uplink-interfered neighboring cell set of the UE 1.

A specific form of the common E-RGCH state information and/or the common E-RGCH configuration parameter information of the cell sent by the second RNC may be as follows:

if common E-RGCH state information of a requested cell is unavailable, for example, the state information is not configured or not activated, return a deactivation (De-Activation) or a disable indication or a "configuration information unavailable indication"; or if common E-RGCH state information of a requested cell is available, directly send common E-RGCH configuration parameter information of the cell, such as, including but not limited to any one or multiple parameter values of an E-RGCH channelization code, an E-RGCH signature sequence and a minimum service grant value; and optionally, an activation, enable or "available indication" may further be carried.

Specifically, the common E-RGCH information may be as shown in the table below:

| Information Element Name |
| --- |
| >De-Activation (deactivation) |
| >>De-Activation (deactivation) |
| >Activation (activation) |
| >>E-RGCH channelization code |
| >>E-RGCH signature sequence |
| >>Minimum service grant |

S12. Receive a radio resource control (RRC) connection establishment request sent by a UE and establish an RRC connection with the UE in a serving cell.

After receiving the common E-RGCH information message sent by the second RNC, the first RNC receives an RRC connection establishment request sent by the UE 1 and establishes an RRC connection with the UE 1 in a cell in which the UE 1 has initiated the RRC connection establishment request, where the cell in which the RRC connection is established with the UE 1 is a serving cell of the UE 1.

S13. Determine a candidate common E-RGCH receiving neighboring cell set of the UE according to the common E-RGCH information message.

In the present application, an intra-frequency neighboring cell set of the serving cell may be all or a part of cells in an intra-frequency neighboring cell set of the serving cell, where the intra-frequency neighboring cell set is sent in a system broadcast message of the serving cell; and the uplink-interfered neighboring cell set is a set of cells subject to uplink interference from the UE 1, where the cells may be determined by the first RNC according to the serving cell to which the UE 1 belongs. A cell in the intra-frequency neighboring cell set of the serving cell of the UE 1 or in the uplink-interfered neighboring cell set of the UE may be managed by the first RNC, or may be managed by the second RNC.

The candidate common E-RGCH receiving neighboring cell set refers to a set of cells sent by the first RNC to the UE, where the cells may be used to receive a relative grant command on a common E-RGCH. Before initiating E-DCH data transmission, the UE in a CELL_FACH state measures signal quality of a common pilot channel of each cell in the candidate common E-RGCH receiving neighboring cell set. If a result of measuring common pilot signal quality of a candidate common E-RGCH link meets a predefined formula, a cell where the link resides is determined as a common E-RGCH receive link cell of the user equipment. That is, the UE will receive a relative grant command on a common E-RGCH channel of the determined common E-RGCH receive link cell.

The intra-frequency neighboring cell set of the serving cell of the UE or the uplink-interfered neighboring cell set of the UE may include a cell without the common E-RGCH feature, or may include a cell whose common E-RGCH feature is currently unavailable, or may also include a cell whose common E-RGCH feature is currently available. Because only a cell whose common E-RGCH feature is currently available can use the common E-RGCH feature, a cell whose common E-RGCH feature is currently available needs to be selected from the intra-frequency neighboring cell set of the serving cell of the UE or from the uplink-interfered neighboring cell set of the UE. In the present application, a set that includes all cells whose common E-RGCH feature is currently available may be called a candidate common E-RGCH receiving neighboring cell set.

Because the intra-frequency neighboring cell set of the serving cell of the UE or the uplink-interfered neighboring cell set of the UE may include a neighboring cell managed by the second RNC, the candidate common E-RGCH receiving neighboring cell set may also include a neighboring cell managed by the second RNC; and because the first RNC has received the common E-RGCH information message sent by the second RNC while the common E-RGCH information message includes the common E-RGCH state information, such common E-RGCH state information of a neighboring cell managed by the second RNC may be used to determine whether the common E-RGCH feature of the neighboring cell is available.

S14. Send common E-RGCH configuration parameter information of each cell in the candidate common E-RGCH receiving neighboring cell set to the UE.

After the candidate common E-RGCH receiving neighboring cell set of the UE 1 is determined, the first RNC sends common E-RGCH configuration parameter information of each cell in the candidate common E-RGCH receiving neighboring cell set to the UE 1, so that the UE 1 can correctly monitor a common E-RGCH of a neighboring cell with the common E-RGCH feature in the uplink-interfered neighboring cell set.

In the present application, by exchanging common E-RGCH configuration parameter information between RNCs, a UE can automatically acquire current common E-RGCH information of an interfered neighboring cell that is managed by another RNC, thereby avoiding the following problem: After the common E-RGCH information of the neighboring cell managed by the another RNC changes, a configuration parameter information of a corresponding common E-RGCH in the UE cannot be updated in time and as a result incorrect monitoring occurs.

In the present application, the exchanging the common E-RGCH information between the first RNC and the second RNC may be specifically implemented in a manner of transmitting a common E-RGCH information message between the first RNC and the second RNC. In the present application, the common E-RGCH information message includes at least one of the common E-RGCH state information and the common E-RGCH configuration parameter information.

Specifically, in the present application, the common E-RGCH configuration parameter information may specifically include one or any combination of an E-RGCH channelization code, an E-RGCH signature sequence and a minimum service grant value.

In the present application, the exchanging a feature information message between the first RNC and the second RNC may be: actively sending, by the second RNC, the feature information message to the first RNC; or feeding back, by the second RNC, the feature information message to the first RNC according to a feature information request message of the first RNC.

Figure 2:
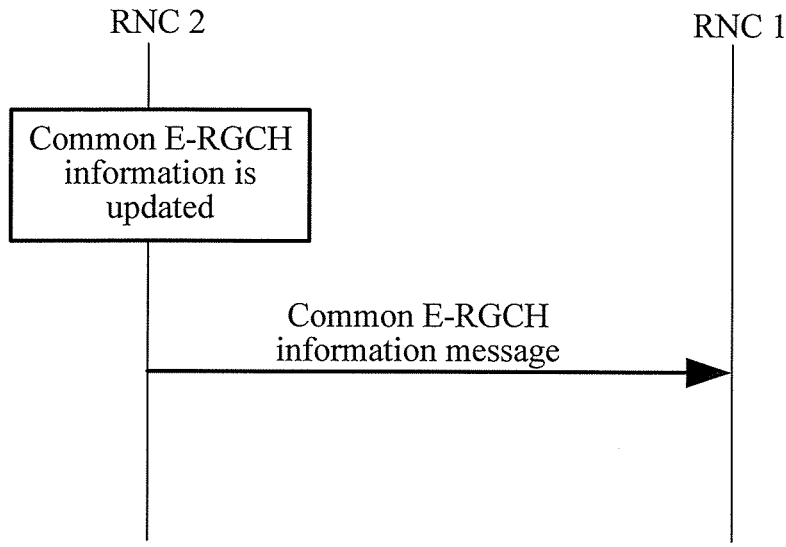
FIG. 2 is a schematic flowchart of a method for exchanging common E-RGCH information according to the present application.

As shown in FIG. 2, in the manner of actively sending, by the second RNC, the common E-RGCH information message to the first RNC, before the receiving a common E-RGCH information message of a neighboring cell managed by a second radio network controller (RNC), where the common E-RGCH information message is sent by the second RNC, the method further includes the following step S01:

Step S01: Determine whether common E-RGCH information of a cell managed by the second RNC is updated; and execute step S11 if yes.

That is, when the common E-RGCH information of a cell managed by the second RNC is updated, the second RNC sends updated common E-RGCH information of the neighboring cell to the first RNC, thereby ensuring that the first RNC can obtain correct common E-RGCH information in time. Specifically, the updating the common E-RGCH information may include the following cases:

1. A common E-RGCH feature of the cell managed by the RNC, that is, the common E-RGCH information of the cell, changes from Available to Unavailable. Such a change may also be called disabling or deactivation of the common E-RGCH feature. For example, the common E-RGCH feature is initially enabled or activated for a cell managed by the second RNC. That is, a function of controlling, through a common E-RGCH channel, uplink interference to a neighboring cell is available for the cell. For a certain reason, an operator or a device vendor manually performs an operation through OAM to disable the feature; or code resources occupied by the common E-RGCH channel are reclaimed due to code resource adjustment of the cell managed by the second RNC and as a result the common E-RGCH is disabled or deactivated.

2. The common E-RGCH feature changes from Unavailable to Available. Such a change may also be called activation of the common E-RGCH feature. For example, when the first RNC requests common E-RGCH information of a cell 2 in the second RNC for a first time, for a certain reason, such as manual shutdown by the operator or the device vendor or code resource limitation of a cell 2, the common E-RGCH feature is disabled or deactivated; and later the common E-RGCH feature is activated or enabled due to a configuration policy change at an OAM backend or a change resulting from code resource adjustment, causing the common E-RGCH feature to be available.

3. A configuration parameter of the common E-RGCH changes. For example, any parameter value of the E-RGCH channelization code, the E-RGCH signature sequence and the minimum service grant value changes.

All the preceding multiple manners of updating the common E-RGCH information of a cell managed by the second RNC may occur. If the cell is an uplink-interfered neighboring cell of the UE 1 of the first RNC 1, the UE 1 cannot correctly monitor the common E-RGCH of the cell. Therefore, step S01 is used as a step for triggering execution of step S11. That is, a manner of actively sending, by the second RNC, the common E-RGCH information message to the first RNC may effectively avoid the preceding cases.

In the present application, the common E-RGCH information message may be specifically one of an information report message, an information exchange initiation response message and an information exchange initiation failure; or another message of an Iur interface.

Figure 3:
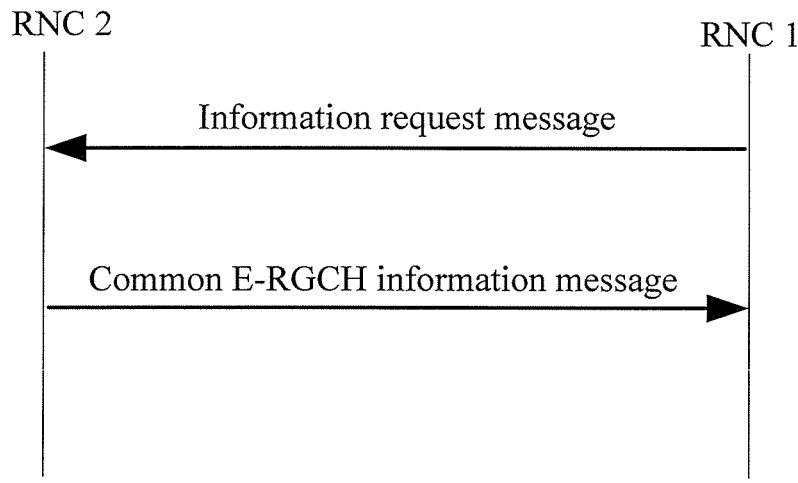
FIG. 3 is another schematic flowchart of a method for exchanging common E-RGCH information according to the present application.

As shown in FIG. 3, in the other manner of exchanging the common E-RGCH information message between the first RNC and the second RNC, a specific manner of feeding back, by the second RNC, the information message to the first RNC according to an information request message of the first RNC may further include the following step:

S02. Send an information request message used to acquire the common E-RGCH information message to the second RNC.

Step S02 goes before step S11. That is to say, the second RNC sends the common E-RGCH information message to the first RNC upon receipt of a configuration information request message of the first RNC. In this way, the first RNC periodically acquires the common E-RGCH information from the second RNC, thereby ensuring that the first RNC can obtain correct common E-RGCH information in time. Alternatively, after the first RNC sends a common E-RGCH information request message for a list of some cells to the second RNC, the second RNC itself determines that: if common E-RGCH information of any cell in the list of the cells managed by the second RNC changes, the second RNC actively initiates reporting of common E-RGCH information of the changed cell to the first RNC.

Specifically, the information request message may be an information exchange initiation request message, so that the second RNC may send the common E-RGCH information message to the first RNC by using one of an information report message, an information exchange initiation response message and an information exchange initiation failure message.

The information request message sent by the first RNC to acquire the common E-RGCH information message may include a destination cell list, used to limit the second RNC to report common E-RGCH information of a cell in the cell list.

In the present application, by exchanging common E-RGCH information between RNCs, a UE can acquire current common E-RGCH information of a cell with a common E-RGCH feature that is managed by another RNC in an uplink-interfered neighboring cell set in time, thereby avoiding the following problem: After the common E-RGCH information of the cell managed by the another RNC changes, configuration parameter information of a corresponding common E-RGCH of an uplink-interfered neighboring cell of the UE cannot be updated in time and as a result incorrect monitoring occurs.

Figure 4:
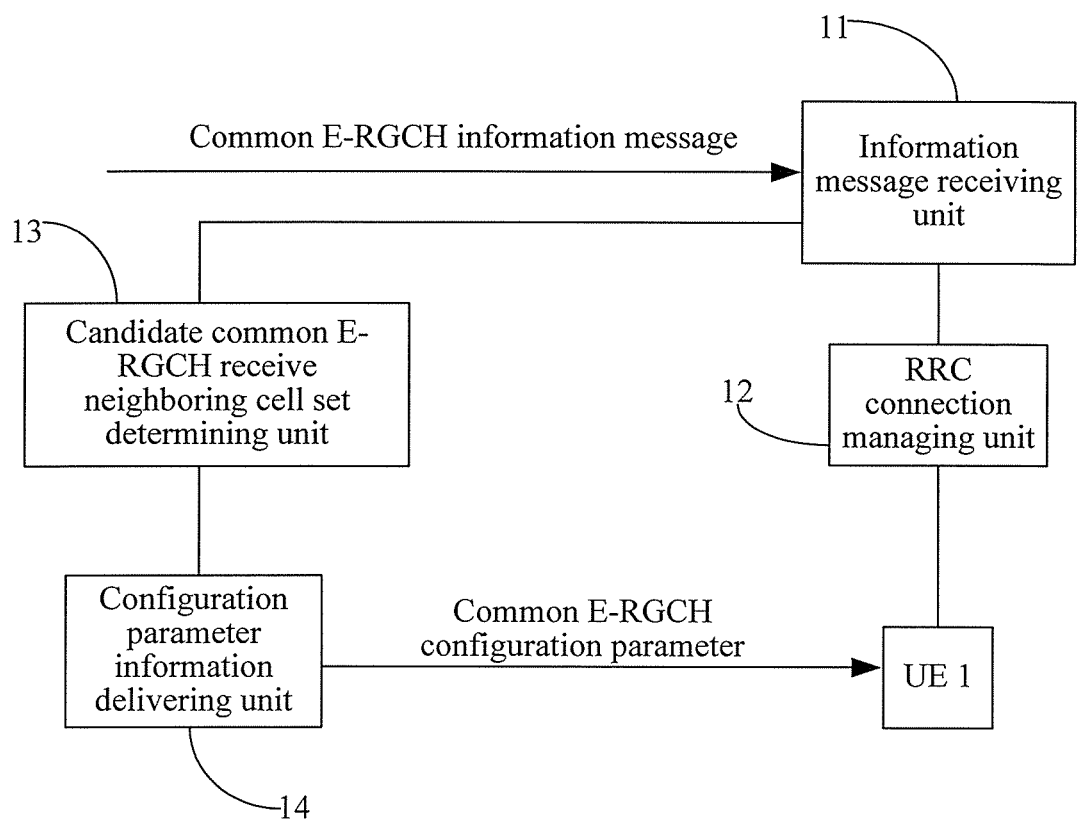
FIG. 4 is a schematic structural diagram of an apparatus for exchanging common E-RGCH information according to the present application.

In another aspect, the present application further provides an apparatus for exchanging common enhanced dedicated channel relative grant channel (common E-RGCH) information. In the present application, the apparatus for exchanging common E-RGCH information is an RNC or a part of an RNC. As shown in FIG. 4, a first RNC includes: an information message receiving unit 11, configured to receive a common E-RGCH information message of a cell managed by a second radio network controller (RNC), where the common E-RGCH information message is sent by the second RNC and includes at least one of common E-RGCH state information and common E-RGCH configuration parameter information.

In the present application, a first RNC and a second RNC that is adjacent to the first RNC are used as an example. A cell managed by the first RNC is a cell on which a UE 1 camps and in which the UE 1 establishes an RRC connection; all neighboring cells of a serving cell that are subject to interference caused by uplink data transmission of the UE 1 may be called an uplink-interfered neighboring cell set; in the uplink-interfered neighboring cell set, a cell may not be managed by the first RNC, that is, the cell may be managed by another RNC; and in the present application, the another RNC may be called the second RNC, that is, a cell managed by the second RNC may belong to the uplink-interfered neighboring cell set of the UE 1.

For example, there are cells respectively numbered 1 to 100 in the first RNC and the second RNC. If the UE 1 performs data transmission in cells numbered 1 to 10 of the first RNC, uplink interference may be caused to cells numbered 81 to 100 of the second RNC. For example, when the UE 1 performs data transmission in a cell 1 of the first RNC, interference may be caused to cells numbered 81 to 85 of the second RNC; and for another example, when the UE 1 performs data transmission in a cell 2 of the first RNC, interference may be caused to cells numbered 86 to 90 of the second RNC.

Even if the first RNC does not know which UEs will establish RRC connections and perform uplink data transmission in which cells of the first RNC currently or later at all, the first RNC may still acquire, at any moment (even when no UE has established any RRC connection in the cells numbered 1 to 10), common E-RGCH information of a cell among the cells managed by the second RNC. The first RNC may acquire, through one or more processes, the Common E-RGCH information of a cell managed by the second RNC from the second RNC.

In the present application, when a common E-RGCH feature of an uplink-interfered neighboring cell is available, a manner of sending an RG down command on a common E-RGCH to a UE in another cell that serves as an interference source may be used to reduce an uplink data transmission rate of the UE, so as to reduce uplink interference. In this manner, first the uplink-interfered neighboring cell needs to support a common E-RGCH function, that is, the common E-RGCH feature of the uplink-interfered neighboring cell is available. In addition, for a cell that supports the common E-RGCH feature, this feature needs to be configured or activated and channel parameters of the common E-RGCH need to be available, that is, the common E-RGCH feature of the cell is available. Furthermore, the UE controlled by the command sent on the common E-RGCH channel needs to obtain current common E-RGCH configuration parameter information of the uplink-interfered neighboring cell beforehand, so that the UE can monitor the common E-RGCH of the uplink-interfered neighboring cell and then the UE adjusts its own uplink transmit power by monitoring and receiving the RG down command sent by the uplink-interfered neighboring cell, thereby reducing interference to the uplink-interfered neighboring cell.

Because a part of uplink-interfered neighboring cells of the UE 1 may be managed by the second RNC, the UE 1 may fail to acquire the common E-RGCH information of a cell managed by the second RNC in the uplink-interfered neighboring cell set. Therefore, in the present application, the information message receiving unit 11 is arranged in the first RNC to acquire a common E-RGCH information message sent by the second RNC and the second RNC sends the common E-RGCH information message of a cell managed by the second RNC to the first RNC, thereby implementing exchange of common E-RGCH information between the first RNC and the second RNC. Specifically, the common E-RGCH information message may include the common E-RGCH state information, or may further include the common E-RGCH configuration parameter information.

In the present application, the common E-RGCH information message may be specifically one of an information report message, an information exchange initiation response message and an information exchange initiation failure; or another message of an Iur interface.

In this way, the first RNC has acquired common E-RGCH information of the serving cell managed by the second RNC in the uplink-interfered neighboring cell set of the UE 1.

A specific form of the common E-RGCH state information and/or the common E-RGCH configuration parameter information of the cell sent by the second RNC may be as follows:

if common E-RGCH state information of a requested cell is unavailable, for example, the state information is not configured or not activated, return a deactivation (De-Activation) or a disabling indication or a "configuration information unavailable indication"; or if common E-RGCH state information of a requested cell is available, directly send common E-RGCH configuration parameter information of the cell, such as, including but not limited to any one or multiple parameter values of an E-RGCH channelization code, an E-RGCH signature sequence and a minimum service grant value; and optionally, an activation, enable or "available indication" may further be carried.

Specifically, the configuration parameter information may be as shown in the table below:

| Information Element Name |
| --- |
| >De-Activation (deactivation) |
| >>De-Activation (deactivation) |
| >Activation (activation) |
| >>E-RGCH channelization code |
| >>E-RGCH signature sequence |
| >>Minimum service grant |

The first RNC further includes: an RRC connection managing unit 12, configured to receive a radio resource control (RRC) connection establishment request sent by a UE and establish an RRC connection with the UE in a serving cell.

After receiving the common E-RGCH parameter information message sent by the second RNC, the first RNC receives, through the RRC connection managing unit 12, an RRC connection establishment request sent by the UE 1 and establishes an RRC connection with the UE 1 in a cell in which the UE 1 has initiated the RRC connection establishment request, where the cell in which the RRC connection is established with the UE 1 is a serving cell of the UE 1; and a candidate common E-RGCH neighboring cell set determining unit 13, configured to determine a candidate common E-RGCH receiving neighboring cell set of the UE according to the common E-RGCH information message.

In the present application, an intra-frequency neighboring cell set of the serving cell may be all or a part of cells in an intra-frequency neighboring cell set of the serving cell, where the intra-frequency neighboring cell set is sent in a system broadcast message of the serving cell; and the uplink-interfered neighboring cell set is a set of cells subject to uplink interference from the UE 1, where the cells may be determined by the first RNC according to the serving cell to which the UE 1 belongs. A cell in the intra-frequency neighboring cell set of the serving cell of the UE 1 or in the uplink-interfered neighboring cell set of the UE may be managed by the first RNC, or may be managed by the second RNC.

The candidate common E-RGCH receiving neighboring cell set refers to a set of cells sent by the first RNC to the UE, where the cells may be used to receive a relative grant command on a common E-RGCH. Before initiating E-DCH data transmission, the UE in a CELL_FACH state measures signal quality of a common pilot channel of each cell in the candidate common E-RGCH receiving neighboring cell set. If a result of measuring common pilot signal quality of a candidate common E-RGCH link meets a predefined formula, a cell where the link resides is determined as a common E-RGCH receive link cell of the user equipment. That is, the UE will receive a relative grant command on a common E-RGCH channel of the determined common E-RGCH receive link cell.

The intra-frequency neighboring cell set of the serving cell of the UE or the uplink-interfered neighboring cell set of the UE may include a cell without the common E-RGCH feature, or may include a cell whose common E-RGCH feature is currently unavailable, or may also include a cell whose common E-RGCH feature is currently available. Because only a cell whose common E-RGCH feature is currently available can use the common E-RGCH feature, a cell whose common E-RGCH feature is currently available needs to be selected from the intra-frequency neighboring cell set of the serving cell of the UE or from the uplink-interfered neighboring cell set of the UE through the candidate common E-RGCH neighboring cell set determining unit. In the present application, a set that includes all cells whose common E-RGCH feature is currently available may be called a candidate common E-RGCH receiving neighboring cell set.

Because the intra-frequency neighboring cell set of the serving cell of the UE or the uplink-interfered neighboring cell set of the UE may include a neighboring cell managed by the second RNC, the candidate common E-RGCH receiving neighboring cell set may also include a neighboring cell managed by the second RNC; and because the first RNC has received the common E-RGCH information message sent by the second RNC while the common E-RGCH information message includes the common E-RGCH state information, such common E-RGCH state information of a neighboring cell managed by the second RNC may be used to determine whether the common E-RGCH feature of the neighboring cell is available.

The first RNC further includes: a configuration parameter information delivering unit 14, configured to send the candidate common E-RGCH receiving neighboring cell set and common E-RGCH configuration parameter information of each cell in the candidate common E-RGCH receiving neighboring cell set to the UE.

After the candidate common E-RGCH receiving neighboring cell set of the UE 1 is determined, the first RNC sends, through the configuration parameter information delivering unit 14, common E-RGCH configuration parameter information of each cell in the candidate common E-RGCH receiving neighboring cell set to the UE 1, so that the UE 1 can correctly monitor a common E-RGCH of a neighboring cell with the common E-RGCH feature in the uplink-interfered neighboring cell set.

In the present application, by exchanging common E-RGCH information between RNCs, a UE can automatically acquire current common E-RGCH information of an interfered neighboring cell that is managed by another RNC, thereby avoiding the following problem: After the common E-RGCH information of the neighboring cell managed by the another RNC changes, a configuration parameter of a corresponding common E-RGCH in the UE cannot be updated in time and as a result incorrect monitoring occurs.

Figure 5:
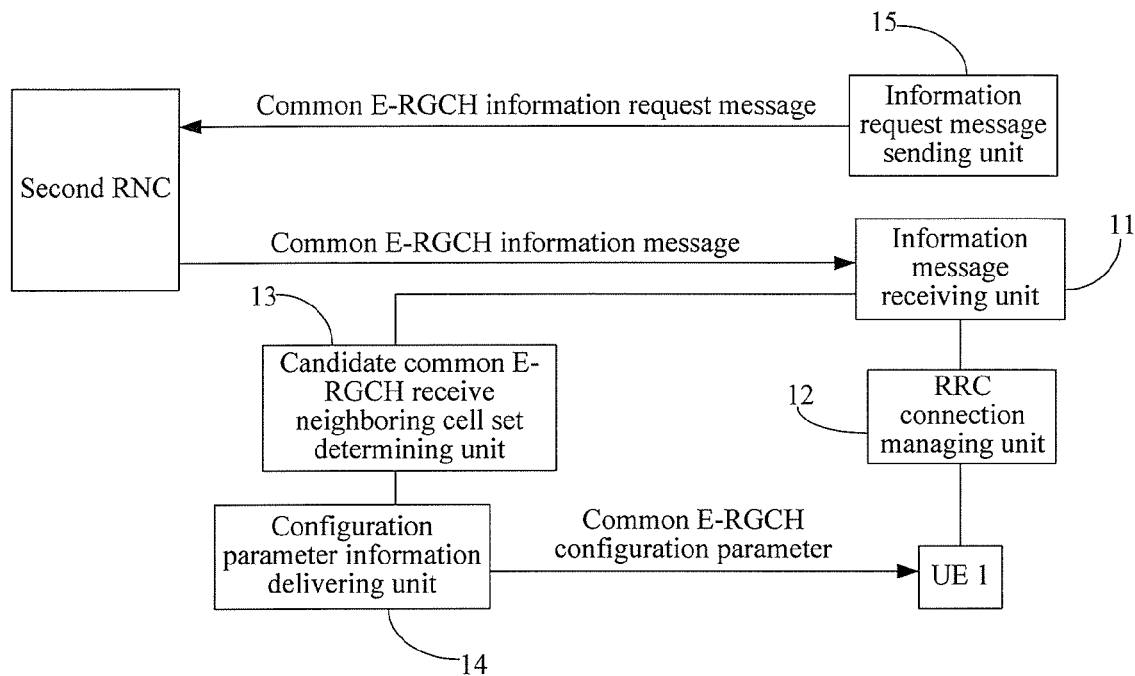
FIG. 5 is another schematic structural diagram of an apparatus for exchanging common E-RGCH information according to the present application.

Further, as shown in FIG. 5, in the present application, the first RNC may further include an information request message sending unit 15, configured to send an information request message used to acquire the common E-RGCH information message to the second RNC.

An information request message is sent to the second RNC through the information request message sending unit 15; and common E-RGCH information may be acquired periodically from the second RNC, thereby ensuring that the first RNC can obtain correct common E-RGCH information in time. Alternatively, after the first RNC sends a common E-RGCH information request message for a list of some cells to the second RNC, the second RNC itself determines that: if common E-RGCH information of any cell in the list of the cells managed by the second RNC changes, the second RNC actively initiates reporting of common E-RGCH information of the changed cell to the first RNC.

Specifically, the information request message may be an information exchange initiation request message, so that the second RNC may send the common E-RGCH information message to the first RNC by using one of an information report message, an information exchange initiation response message and an information exchange initiation failure message.

In the present application, by exchanging common E-RGCH configuration parameter information between RNCs, a UE can acquire current common E-RGCH configuration parameter information of a cell with a common E-RGCH feature that is managed by another RNC in an uplink-interfered neighboring cell set in time, thereby avoiding the following problem: After common E-RGCH state information or the common E-RGCH configuration parameter information of the cell managed by the another RNC changes, configuration parameter information of a corresponding common E-RGCH of an uplink-interfered neighboring cell of the UE cannot be updated in time and as a result incorrect monitoring occurs.

Figure 6:
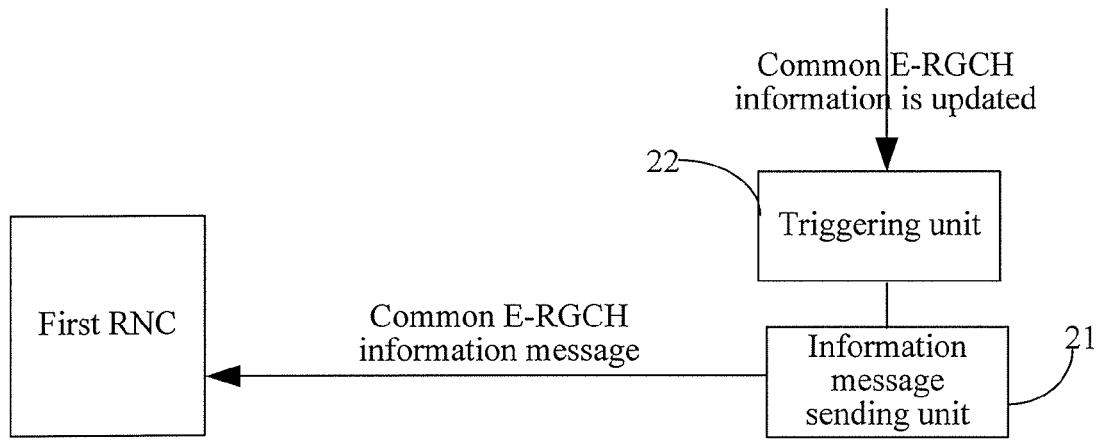
FIG. 6 is another schematic structural diagram of an apparatus for exchanging common E-RGCH information according to the present application.

In another aspect, the present application further provides an apparatus for exchanging common E-RGCH information. In the present application, the apparatus for exchanging common E-RGCH information is an RNC or a part of an RNC. As shown in FIG. 6, a second RNC includes an information message sending unit 21.

The information message sending unit 21 is configured to send a common E-RGCH information message of a cell managed by the second RNC, where the common E-RGCH information message includes at least one of common E-RGCH state information and common E-RGCH configuration parameter information.

In the present application, in order to enable common E-RGCH information in a first RNC to keep synchronous and updated with a current state and a configuration parameter of a current common E-RGCH of a cell managed by the second RNC, the information message sending unit 21 is further arranged in the second RNC and sends the common E-RGCH information message to the first RNC, so that a UE of the first RNC can acquire current common E-RGCH information of a cell with a common E-RGCH feature that is managed by another RNC in an uplink-interfered neighboring cell set, thereby avoiding the following problem: After the common E-RGCH information of the cell managed by the another RNC changes, configuration parameter information of a corresponding common E-RGCH of an uplink-interfered neighboring cell of the UE cannot be updated in time and as a result incorrect monitoring occurs.

Further, in the present application, the second RNC may further include a triggering unit 22, configured to trigger, when it is determined that common E-RGCH information of a cell managed by the second RNC is updated, the information message sending unit to send an updated common E-RGCH information message; and Through the triggering unit 22, as long as the common E-RGCH information of a cell managed by the second RNC is updated, the information message sending unit may send the common E-RGCH information to the first RNC within shortest possible time, so that a UE of the first RNC can acquire configuration parameter information of a current common E-RGCH of a cell with a common E-RGCH feature that is managed by another RNC in an uplink-interfered neighboring cell set in a more timely manner, thereby avoiding the following problem: After common E-RGCH state information or the common E-RGCH configuration parameter information of the cell managed by the another RNC changes, configuration parameter information of a corresponding common E-RGCH of an uplink-interfered neighboring cell of the UE cannot be updated in time and as a result incorrect monitoring occurs.

In addition, in the present application, the second RNC may further include an update determining unit, configured to determine whether common E-RGCH information of a cell managed by the second RNC is updated, where the updating includes:

changing a common E-RGCH feature of the cell managed by the second RNC from Available to Unavailable, changing the common E-RGCH feature from Unavailable to Available, or changing a configuration parameter of a common E-RGCH.

Figure 7:
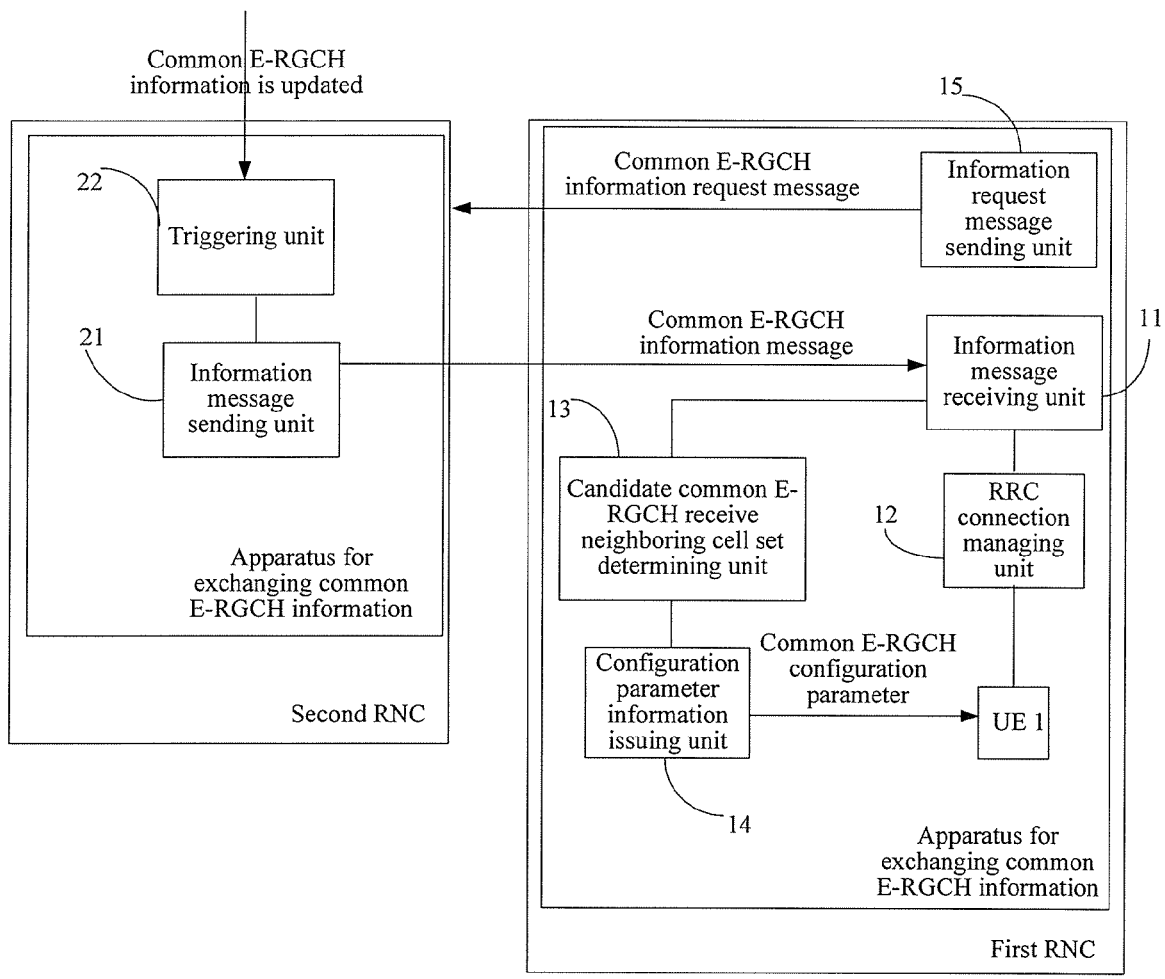
FIG. 7 is a schematic structural diagram of a system for exchanging common E-RGCH information according to the present application.

As shown in FIG. 7, in another aspect, the present application further provides a system for exchanging common E-RGCH information, including: the apparatus for exchanging common E-RGCH information in the first RNC and the apparatus for exchanging common E-RGCH information in the second RNC according to the foregoing embodiments.

In the present application, the technical solution and beneficial effect of the apparatus for exchanging common E-RGCH information in the first RNC are similar to those of the apparatus for exchanging common E-RGCH information shown in FIG. 4 and the technical solution and beneficial effect of the apparatus for exchanging common E-RGCH information in the second RNC are similar to those of the apparatus for exchanging common E-RGCH information shown in FIG. 5 and no further details are provided herein.

Figure 8:
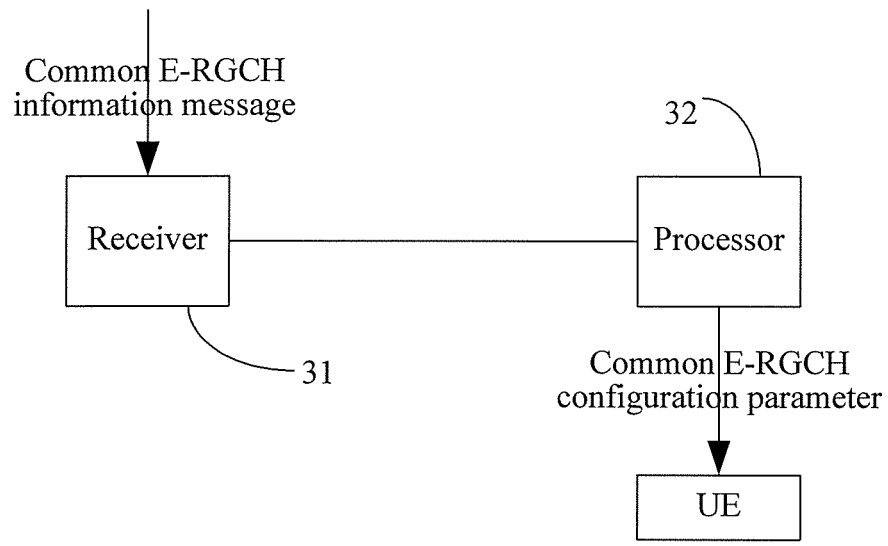
FIG. 8 is another schematic structural diagram of an apparatus for exchanging common E-RGCH information according to the present application.

In another aspect, the present application further provides an apparatus for exchanging common enhanced dedicated channel relative grant channel (common E-RGCH) information. As shown in FIG. 8, the apparatus includes: a receiver 31 and a processor 32.

The receiver 31 is configured to receive a common E-RGCH information message of a cell managed by a second radio network controller (RNC), where the common E-RGCH information message is sent by the second RNC and includes at least one of common E-RGCH state information and common E-RGCH configuration parameter information.

In the present application, a first RNC and a second RNC that is adjacent to the first RNC are used as an example. A cell managed by the first RNC is a cell on which a UE 1 camps and in which the UE 1 establishes an RRC connection; all neighboring cells of a serving cell that are subject to interference caused by uplink data transmission of the UE 1 may be called an uplink-interfered neighboring cell set; in the uplink-interfered neighboring cell set, a cell may not be managed by the first RNC, that is, the cell may be managed by another RNC; and in the present application, the another RNC may be called the second RNC, that is, a cell managed by the second RNC may belong to the uplink-interfered neighboring cell set of the UE 1.

For example, there are cells respectively numbered 1 to 100 in the first RNC and the second RNC. If the UE 1 performs data transmission in cells numbered 1 to 10 of the first RNC, uplink interference may be caused to cells numbered 81 to 100 of the second RNC. For example, when the UE 1 performs data transmission in a cell 1 of the first RNC, interference may be caused to cells numbered 81 to 85 of the second RNC; and for another example, when the UE 1 performs data transmission in a cell 2 of the first RNC, interference may be caused to cells numbered 86 to 90 of the second RNC.

Even if the first RNC does not know which UEs will establish RRC connections and perform uplink data transmission in which cells of the first RNC currently or later at all, the first RNC may still acquire, at any moment (even when no UE has established any RRC connection in the cells numbered 1 to 10), common E-RGCH information of a cell among the cells managed by the second RNC. The first RNC may acquire, through one or more processes, the Common E-RGCH information of a cell managed by the second RNC from the second RNC.

In the present application, when a common E-RGCH feature of an uplink-interfered neighboring cell is available, a manner of sending an RG down command on a common E-RGCH to a UE in another cell that serves as an interference source may be used to reduce an uplink data transmission rate of the UE, so as to reduce uplink interference. In this manner, first the uplink-interfered neighboring cell needs to support a common E-RGCH function, that is, the common E-RGCH feature of the uplink-interfered neighboring cell is available. In addition, for a cell that supports the common E-RGCH feature, this feature needs to be configured or activated and channel parameters of the common E-RGCH need to be available, that is, the common E-RGCH feature of the cell is available. Furthermore, the UE controlled by the command sent on the common E-RGCH channel needs to obtain current common E-RGCH configuration parameter information of the uplink-interfered neighboring cell beforehand, so that the UE can monitor the common E-RGCH of the uplink-interfered neighboring cell and then the UE adjusts its own uplink transmit power by monitoring and receiving the RG down command sent by the uplink-interfered neighboring cell, thereby reducing interference to the uplink-interfered neighboring cell.

Because a part of uplink-interfered neighboring cells of the UE 1 may be managed by the second RNC, the UE 1 may fail to acquire the common E-RGCH information of a cell managed by the second RNC in the uplink-interfered neighboring cell set. Therefore, in the present application, the receiver 31 is arranged in the first RNC to acquire a common E-RGCH information message sent by the second RNC and the second RNC sends the common E-RGCH information message of a cell managed by the second RNC to the first RNC, thereby implementing exchange of common E-RGCH information between the first RNC and the second RNC. Specifically, the common E-RGCH information message may include the common E-RGCH state information, or may further include the common E-RGCH configuration parameter information.

In the present application, the common E-RGCH information message may be specifically one of an information report message, an information exchange initiation response message and an information exchange initiation failure; or another message of an Iur interface.

In this way, the first RNC has acquired common E-RGCH information of the serving cell managed by the second RNC in the uplink-interfered neighboring cell set of the UE 1.

A specific form of the common E-RGCH state information and/or the common E-RGCH configuration parameter information of the cell sent by the second RNC may be as follows:

if common E-RGCH information of a requested cell is unavailable, for example, the information is not configured or not activated, return a deactivation (De-Activation) or a disable indication or a "configuration information unavailable indication"; or if common E-RGCH information of a requested cell is available, directly send common E-RGCH configuration parameter information of the cell, such as, including but not limited to any one or multiple parameter values of an E-RGCH channelization code, an E-RGCH signature sequence and a minimum service grant value; and optionally, an activation, enable or "available indication" may further be carried.

Specifically, the configuration parameter information may be as shown in the table below:

| Information Element Name |
| --- |
| >De-Activation (deactivation) |
| >>De-Activation (deactivation) |
| >Activation (activation) |
| >>E-RGCH channelization code |
| >>E-RGCH signature sequence |
| >>Minimum service grant |

The processor 32 is configured to receive a radio resource control (RRC) connection establishment request sent by a UE and establish an RRC connection with the UE in a serving cell; determine a candidate common E-RGCH receiving neighboring cell set of the UE according to the common E-RGCH information message; and send the candidate common E-RGCH receiving neighboring cell set and common E-RGCH configuration parameter information of each cell in the candidate common E-RGCH receiving neighboring cell set to the UE.

After receiving the common E-RGCH information message sent by the second RNC, the first RNC receives, through the processor 32, an RRC connection establishment request sent by the UE 1 and establishes an RRC connection with the UE 1 in a cell in which the UE 1 has initiated the RRC connection establishment request, where the cell in which the RRC connection is established with the UE 1 is a serving cell of the UE 1.

In addition, the processor 32 is further configured to determine a candidate common E-RGCH receive set of the UE according to the common E-RGCH information message.

In the present application, an intra-frequency neighboring cell set of the serving cell may be all or a part of cells in an intra-frequency neighboring cell set of the serving cell, where the intra-frequency neighboring cell set is sent in a system broadcast message of the serving cell; and the uplink-interfered neighboring cell set is a set of cells subject to uplink interference from the UE 1, where the cells may be determined by the first RNC according to the serving cell to which the UE 1 belongs. A cell in the intra-frequency neighboring cell set of the serving cell of the UE 1 or in the uplink-interfered neighboring cell set of the UE may be managed by the first RNC, or may be managed by the second RNC.

The candidate common E-RGCH receiving neighboring cell set refers to a set of cells sent by the first RNC to the UE, where the cells may be used to receive a relative grant command on a common E-RGCH. Before initiating E-DCH data transmission, the UE in a CELL_FACH state measures signal quality of a common pilot channel of each cell in the candidate common E-RGCH receiving neighboring cell set. If a result of measuring common pilot signal quality of a candidate common E-RGCH link meets a predefined formula, a cell where the link resides is determined as a common E-RGCH receive link cell of the user equipment. That is, the UE will receive a relative grant command on a common E-RGCH channel of the determined common E-RGCH receive link cell.

The intra-frequency neighboring cell set of the serving cell of the UE or the uplink-interfered neighboring cell set of the UE may include a cell without the common E-RGCH feature, or may include a cell whose common E-RGCH feature is currently unavailable, or may also include a cell whose common E-RGCH feature is currently available. Because only a cell whose common E-RGCH feature is currently available can use the common E-RGCH feature, a cell whose common E-RGCH feature is currently available needs to be selected from the intra-frequency neighboring cell set of the serving cell of the UE or from the uplink-interfered neighboring cell set of the UE through the candidate common E-RGCH neighboring cell set determining unit. In the present application, a set that includes all cells whose common E-RGCH feature is currently available may be called a candidate common E-RGCH receiving neighboring cell set.

Because the intra-frequency neighboring cell set of the serving cell of the UE or the uplink-interfered neighboring cell set of the UE may include a neighboring cell managed by the second RNC, the candidate common E-RGCH receiving neighboring cell set may also include a neighboring cell managed by the second RNC; and because the first RNC has received the common E-RGCH information message sent by the second RNC while the common E-RGCH information message includes the common E-RGCH state information, such common E-RGCH state information of a neighboring cell managed by the second RNC may be used to determine whether the common E-RGCH feature of the neighboring cell is available.

In addition, the processor 32 is further configured to send the candidate common E-RGCH neighboring cell set and common E-RGCH configuration parameter information of each cell in the candidate common E-RGCH neighboring cell set to the UE.

After the candidate common E-RGCH receiving neighboring cell set of the UE 1 is determined, the first RNC sends, through the processor 32, common E-RGCH configuration parameter information of each cell in the candidate common E-RGCH receiving neighboring cell set to the UE 1, so that the UE 1 can correctly monitor a common E-RGCH channel of a neighboring cell with the common E-RGCH feature in the uplink-interfered neighboring cell set.

In the present application, by exchanging common E-RGCH information between RNCs, a UE can automatically acquire current common E-RGCH information of an interfered neighboring cell that is managed by another RNC, thereby avoiding the following problem: After the common E-RGCH information of the neighboring cell managed by the another RNC changes, a configuration parameter of a corresponding common E-RGCH in the UE cannot be updated in time and as a result incorrect monitoring occurs.

Further, in the present application, the processor 32 is further configured to send an information request message used to acquire the common E-RGCH information message to the second RNC.

An information request message is sent to the second RNC through the processor 32; and common E-RGCH information may be acquired periodically from the second RNC, thereby ensuring that the first RNC can obtain correct common E-RGCH information in time. Alternatively, after the first RNC sends a common E-RGCH information request message for a list of some cells to the second RNC, the second RNC itself determines that: if common E-RGCH information of any cell in the list of the cells managed by the second RNC changes, the second RNC actively initiates reporting of common E-RGCH information of the changed cell to the first RNC.

Specifically, the information request message may be an information exchange initiation request message, so that the second RNC may send the common E-RGCH information message to the first RNC by using one of an information report message, an information exchange initiation response message and an information exchange initiation failure message.

In the present application, by exchanging common E-RGCH configuration parameter information between RNCs, a UE can acquire current common E-RGCH configuration parameter information of a cell with a common E-RGCH feature that is managed by another RNC in an uplink-interfered neighboring cell set in time, thereby avoiding the following problem: After common E-RGCH state information or the common E-RGCH configuration parameter information of the cell managed by the another RNC changes, configuration parameter information of a corresponding common E-RGCH of an uplink-interfered neighboring cell of the UE cannot be updated in time and as a result incorrect monitoring occurs.

Figure 9:
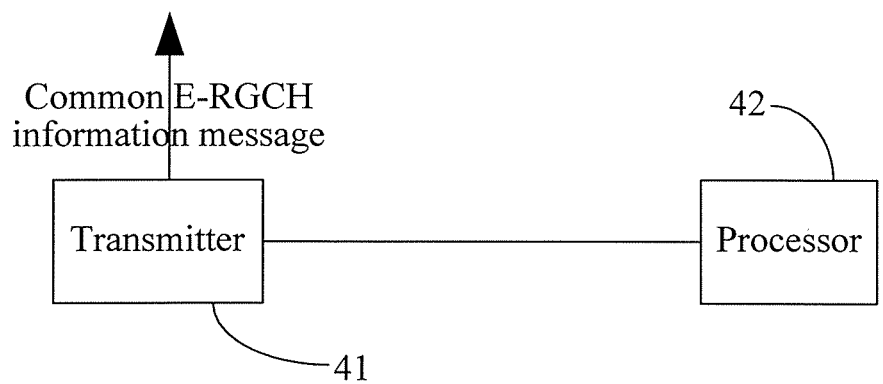
FIG. 9 is another schematic structural diagram of an apparatus for exchanging common E-RGCH information according to the present application.

In another aspect, the present application further provides an apparatus for exchanging common enhanced dedicated channel relative grant channel (common E-RGCH) information. As shown in FIG. 9, the apparatus includes: a transmitter 41 and a processor 42.

The transmitter 41 is configured to send a common E-RGCH information message of a cell managed by a second RNC, where the common E-RGCH information message includes at least one of common E-RGCH state information and common E-RGCH configuration parameter information.

In order to enable common E-RGCH information in a first RNC to keep synchronous and updated with a current state and a configuration parameter of a current common E-RGCH of a cell managed by the second RNC, the transmitter 41 is further arranged in the second RNC and sends the common E-RGCH information message to the first RNC, so that a UE of the first RNC can acquire current common E-RGCH information of a cell with a common E-RGCH feature that is managed by another RNC in an uplink-interfered neighboring cell set, thereby avoiding the following problem: After the common E-RGCH information of the cell managed by the another RNC changes, configuration parameter information of a corresponding common E-RGCH of an uplink-interfered neighboring cell of the UE cannot be updated in time and as a result incorrect monitoring occurs.

The processor 42 is configured to periodically trigger the transmitter to send the common E-RGCH information message, or configured to trigger, when it is determined that common E-RGCH information of a cell managed by the second RNC is updated, the information message sending unit to send the common E-RGCH information message, or configured to send the common E-RGCH information message when an information request message sent by the first RNC for requesting the common E-RGCH information message is received.

In the second RNC according to the present application, the processor 42 is configured to periodically trigger the transmitter to send the common E-RGCH information message, or configured to trigger, when it is determined that common E-RGCH information of a cell managed by the second RNC is updated, the information message sending unit to send the common E-RGCH information message, or configured to send the common E-RGCH information message when an information request message sent by the first RNC for requesting the common E-RGCH information message is received.

In the present application, there may be multiple conditions for triggering the transmitter 41 to send the common E-RGCH information message: the transmitter may be periodically triggered, so that the common E-RGCH information message may be sent to the first RNC at fixed time; or the common E-RGCH information message may be fed back to the first RNC according to a common E-RGCH information request message sent by the first RNC; or the transmitter 41 may send the common E-RGCH information to the first RNC within shortest possible time when the common E-RGCH information of a cell managed by the second RNC is updated, so that the a UE of the first RNC can acquire configuration parameter information of a current common E-RGCH of a cell with a common E-RGCH feature that is managed by another RNC in an uplink-interfered neighboring cell set in a more timely manner, thereby avoiding the following problem: After common E-RGCH state information or the common E-RGCH configuration parameter information of the cell managed by the another RNC changes, configuration parameter information of a corresponding common E-RGCH of an uplink-interfered neighboring cell of the UE cannot be updated in time and as a result incorrect monitoring occurs.

In the present application, the common E-RGCH information message may be specifically one of an information report message, an information exchange initiation response message and an information exchange initiation failure; or another message of an Iur interface.

In addition, in the present application, it is determined whether the common E-RGCH information of a cell managed by the second RNC is updated, where the updating specifically includes:
changing a common E-RGCH feature of the cell managed by the second RNC from Available to Unavailable, changing the common E-RGCH feature from Unavailable to Available, or changing a configuration parameter of a common E-RGCH.

In the present application, by exchanging common E-RGCH configuration parameter information between RNCs, a UE can automatically acquire current common E-RGCH information of an interfered neighboring cell that is managed by another RNC, thereby avoiding the following problem: After the common E-RGCH information of the neighboring cell managed by the another RNC changes, a configuration parameter of a corresponding common E-RGCH in the UE cannot be updated in time and as a result incorrect monitoring occurs.

It should be noted that each embodiment in the specification is described in a progressive manner. Every embodiment illustrates in emphasis what is different from the other embodiments. The same or similar parts in the embodiments are just references to each other.

The preceding description disclosed in the embodiments allows a person skilled in the art to implement or use the present invention. Multiple modifications to these embodiments are apparent for a person skilled in the art. The general principle defined in this specification may be implemented in other embodiments without departing from scope of the present invention. Therefore, the present invention will not be limited to the embodiments described in this specification but extends to a widest scope that complies with the principle and novelty disclosed in this specification.

What is claimed is:

1. A method for exchanging common enhanced dedicated channel relative grant channel (E-RGCH) information, the method comprising:
   receiving a common E-RGCH information message of a cell managed by a first radio network controller (RNC) from a second RNC, wherein the common E-RGCH information message is sent by the second RNC and comprises common E-RGCH state information or common E-RGCH configuration parameter information;
   receiving a radio resource control (RRC) connection establishment request sent by a user equipment (UE);
   establishing an RRC connection with the UE in a serving cell according to the RRC connection establishment request;
   determining a candidate common E-RGCH receiving neighboring cell set of the UE according to the common E-RGCH information message; and
   sending common E-RGCH configuration parameter information of each cell in the candidate common E-RGCH receiving neighboring cell set to the UE.

2. The method for exchanging common E-RGCH information according to claim 1, further comprising:
   updating common E-RGCH information of the cell managed by the second RNC.

3. The method for exchanging common E-RGCH information according to claim 2, wherein updating common E-RGCH information of the cell managed by the second RNC comprises at least one of:
   changing the common E-RGCH information of the cell managed by the second RNC from Available to Unavailable;
   changing the common E-RGCH information from Unavailable to Available; and
   changing a configuration parameter of a common E-RGCH.

4. The method for exchanging common E-RGCH information according to claim 1, wherein the common E-RGCH information message comprises at least one of:
   an information report message, an information exchange initiation response message and an information exchange initiation failure message.

5. The method for exchanging common E-RGCH information according to claim 1, wherein the common E-RGCH configuration parameter information comprises at least one of:
   an E-RGCH channelization code, an E-RGCH signature sequence and a minimum service grant value.

6. The method for exchanging common E-RGCH information according to claim 1, wherein the common E-RGCH state information comprises at least one of:
   activation of a common E-RGCH feature, deactivation of the common E-RGCH feature, enabling of a configuration parameter of the common E-RGCH, disabling of a configuration parameter of the common E-RGCH, configuration of a configuration parameter of the common E-RGCH as Available and configuration of a configuration parameter of the common E-RGCH as Unavailable.

7. The method for exchanging common E-RGCH information according to claim 1, further comprising:
   sending an information request message used to acquire the common E-RGCH information message to the second RNC.

8. The method for exchanging common E-RGCH information according to claim 7, wherein the information request message comprises an information exchange initiation request message.

9. An apparatus for exchanging common enhanced dedicated channel relative grant channel (E-RGCH) information, the apparatus comprising:
a receiver, configured to receive a common E-RGCH information message of a cell managed by a second radio network controller (RNC) from the second RNC, wherein the common E-RGCH information message is sent by the second RNC and comprises at least one of: common E-RGCH state information and common E-RGCH configuration parameter information; and
a processor, configured to:
receive a radio resource control (RRC) connection establishment request sent by a user equipment (UE) and establish an RRC connection with the UE in a serving cell,
determine a candidate common E-RGCH receiving neighboring cell set of the UE according to the common E-RGCH information message, and
send the candidate common E-RGCH receiving neighboring cell set and common E-RGCH configuration parameter information of each cell in the candidate common E-RGCH receiving neighboring cell set to the UE.

10. The apparatus for exchanging common E-RGCH information according to claim 9, wherein the common E-RGCH information message comprises at least one of:
an information report message, an information exchange initiation response message and an information exchange initiation failure message.

11. The apparatus for exchanging common E-RGCH information according to claim 10, wherein the common E-RGCH configuration parameter information comprises at least one of:
an E-RGCH channelization code, an E-RGCH signature sequence and a minimum service grant value.

12. The apparatus for exchanging common E-RGCH information according to claim 9, further comprising:
a transmitter configured to send an information request message used to acquire the common E-RGCH information message to the second RNC.

13. The apparatus for exchanging common E-RGCH information according to claim 12, wherein the information request message comprises an information exchange initiation request message.

14. An apparatus for exchanging common enhanced dedicated channel relative grant channel (E-RGCH) information, the apparatus comprising:
a transmitter, configured to send a common E-RGCH information message of a cell managed by a second radio network controller (RNC) to a first RNC, wherein the common E-RGCH information message comprises common E-RGCH state information or common E-RGCH configuration parameter information, wherein the first RNC is configured to receive a radio resource control (RRC) connection establishment request sent by a user equipment (UE), establish an RRC connection with the UE in a serving cell, determine a candidate common E-RGCH receiving neighboring cell set of the UE according to the common E-RGCH information message, and send the candidate common E-RGCH receiving neighboring cell set and common E-RGCH configuration parameter information of each cell in the candidate common E-RGCH receiving neighboring cell set to the UE; and
a processor, configured to implement at least one of:
periodically triggering the transmitter to send the common E-RGCH information message,
triggering, when it is determined that common E-RGCH information of the cell managed by the second RNC is updated, the transmitter to send the common E-RGCH information message, and
triggering, when an information request message sent by the first RNC for requesting the common E-RGCH information message is received, the transmitter to send the common E-RGCH information message.

15. The apparatus for exchanging common E-RGCH information according to claim 14, wherein the processor is configured to determine whether the common E-RGCH information of the cell managed by the second RNC is updated by determining whether at least one of:
a common E-RGCH feature of the cell managed by the second RNC is changed from Available to Unavailable;
a common E-RGCH feature of the cell managed by the second RNC is changed from Unavailable to Available; and
a configuration parameter of a common E-RGCH is changed.

16. The apparatus for exchanging common E-RGCH information according to claim 14, wherein the common E-RGCH information message comprises at least one of:
an information report message, an information exchange initiation response message and an information exchange initiation failure message.

17. A method for exchanging common enhanced dedicated channel relative grant channel (E-RGCH) information, the method comprising:
sending a common E-RGCH information message of a cell managed by a second radio network controller (RNC) to a first RNC, wherein the common E-RGCH information message comprises common E-RGCH state information or common E-RGCH configuration parameter information, wherein the first RNC is configured to receive a radio resource control (RRC) connection establishment request sent by a user equipment (UE), establish an RRC connection with the UE in a serving cell, determine a candidate common E-RGCH receiving neighboring cell set of the UE according to the common E-RGCH information message, and send the candidate common E-RGCH receiving neighboring cell set and common E-RGCH configuration parameter information of each cell in the candidate common E-RGCH receiving neighboring cell set to the UE.

18. The method for exchanging common E-RGCH information according to claim 17, further comprising:
periodically sending the common E-RGCH information message; or
determining that common E-RGCH information of the cell managed by the second RNC is updated, and then sending the common E-RGCH information message; or
determining an information request message sent by the first RNC for requesting the common E-RGCH information message is received, and then sending the common E-RGCH information message.

19. The method for exchanging common E-RGCH information according to claim 18, wherein determining whether the common E-RGCH information of the cell managed by the second RNC is updated comprises determining whether at least one of:
- a common E-RGCH feature of the cell managed by the second RNC is changed from Available to Unavailable;
- a common E-RGCH feature of the cell managed by the second RNC is changed from Unavailable to Available; and
- a configuration parameter of a common E-RGCH is changed.

20. The method for exchanging common E-RGCH information according to claim 17, wherein the common E-RGCH information message comprises at least one of:
- an information report message, an information exchange initiation response message and an information exchange initiation failure message.

* * * * *